United States Patent [19]
Heeks et al.

[11] Patent Number: 6,037,092
[45] Date of Patent: Mar. 14, 2000

[54] STABILIZED FLUOROSILICONE FUSER MEMBERS

[75] Inventors: George J. Heeks, Rochester; David J. Gervasi, West Henrietta; Arnold W. Henry; Santokh S. Badesha, both of Pittsford, all of N.Y.

[73] Assignee: Xerox Corporation, Stamford, Conn.

[21] Appl. No.: 09/376,747

[22] Filed: Aug. 17, 1999

[51] Int. Cl.[7] .......................... G03G 15/20; G03G 21/00; B32B 27/00
[52] U.S. Cl. ........................ 430/124; 428/421; 399/325
[58] Field of Search ........................ 399/325; 430/124; 428/421

[56] References Cited

U.S. PATENT DOCUMENTS

| | | | |
|---|---|---|---|
| 3,002,927 | 10/1961 | Awe et al. | 252/37.2 |
| 4,150,181 | 4/1979 | Smith | 427/444 |
| 4,711,818 | 12/1987 | Henry | 428/421 |
| 5,395,725 | 3/1995 | Bluett et al. | 430/124 |
| 5,464,703 | 11/1995 | Ferrar et al. | 428/421 |
| 5,493,376 | 2/1996 | Heeks et al. | 355/284 |
| 5,563,202 | 10/1996 | Ferrar et al. | 524/430 |
| 5,864,740 | 1/1999 | Heeks et al. | 399/325 |
| 5,937,257 | 8/1999 | Condello et al. | 399/325 |

*Primary Examiner*—John Goodrow
*Attorney, Agent, or Firm*—Judith L. Byorick

[57] ABSTRACT

Disclosed is a fuser member comprising a substrate and at least one layer thereover, said layer comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

20 Claims, 3 Drawing Sheets

STABILIZED FLUOROSILICONE FUSER MEMBERS

BACKGROUND OF THE INVENTION

The present invention is directed to crosslinked fluorosilicone materials. More specifically, the present invention is directed to thermally stabilized crosslinked fluorosilicone materials suitable for applications such as fuser member coatings for imaging processes and the like. One embodiment of the present invention is directed to a fuser member comprising a substrate and at least one layer thereover, said layer comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and pigment particles, or toner. The visible toner image is then in a loose powdered form and can be easily disturbed or destroyed. The toner image is usually fixed or fused upon a support, which can be the photosensitive member itself, or some other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner to be bonded firmly to the support.

Typically, the thermoplastic resin particles are fused to the substrate by heating to a temperature of from about 90° C. to about 200° C. or higher, depending on the softening range of the particular resin used in the toner. It may be undesirable, however, to increase the temperature of the substrate substantially higher than about 250° C. because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact a belt member in pressure contact with a roll, a belt member in pressure contact with a heater, and the like. Heat can be applied by heating one or both of the rolls, plate members, or belt members. Fusing of the toner particles occurs when the proper combination of heat, pressure, and/or contact for the optimum time period are provided. The balancing of these variables to bring about the fusing of the toner particles is well known in the art, and can be adjusted to suit particular machines or process conditions.

During the operation of one fusing system in which heat is applied to cause thermal fusing of the toner particles onto a support, both the toner image and the support are passed through a nip formed between a pair of rolls, plates, belts, or combination thereof. The concurrent transfer of heat and the application of pressure in the nip effects the fusing of the toner image onto the support. It is important in the fusing process that minimal or no offset of the toner particles from the support to the fuser member takes place during normal operations. Toner particles offset onto the fuser member can subsequently transfer to other parts of the machine or onto the support in subsequent copying cycles, thereby increasing the image background, causing inadequate copy quality, causing inferior marks on the copy, or otherwise interfering with the material being copied there as well as causing toner contamination of other parts of the machine. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release properties of the fuser member, and accordingly it is desirable to provide a fusing surface having a low surface energy to provide the necessary release.

To ensure and maintain good release properties of the fuser member, it has become customary to apply release agents to the fuser member during the fusing operation. Typically, these materials are applied as thin films of, for example, silicone oils, such as polydimethyl siloxane, or substituted silicone oils, such as amino-substituted oils, mercapto-substituted oils, or the like, to prevent toner offset. In addition, fillers can be added to the outer layers of fuser members to increase the bonding of the fuser oil to the surface of the fuser member, thereby imparting improved release properties.

The use of polymeric release agents having functional groups which interact with a fuser member to form a thermally stable, renewable self-cleaning layer having good release properties for electroscopic thermoplastic resin toners, is described in, for example, U.S. Pat. No. 4,029,827, U.S. Pat. No. 4,101,686, and U.S. Pat. No. 4,185,140, the disclosures of each of which are totally incorporated herein by reference. Disclosed in U.S. Pat. No. 4,029,827 is the use of polyorganosiloxanes having mercapto functionality as release agents. U.S. Pat. No. 4,101,686 and U.S. Pat. No. 4,185,140 are directed to polymeric release agents having functional groups such as carboxy, hydroxy, epoxy, amino, isocyanate, thioether, and mercapto groups as release fluids.

It is important to select the correct combination of fuser surface material, any filler incorporated or contained therein, and fuser oil. Specifically, it is important that the outer layer of the fuser member react sufficiently with the selected fuser oil to obtain sufficient release. To improve the bonding of fuser oils with the outer surface of the fuser member, fillers have been incorporated into or added to the outer surface layer of the fuser members. The use of a filler can aid in decreasing the amount of fusing oil necessary by promoting sufficient bonding of the fuser oil to the outer surface layer of the fusing member. It is important, however, that the filler not degrade the physical properties of the outer layer of the fuser member, and it is also important that the filler not cause too much of an increase in the surface energy of the outer layer.

Fillers are also sometimes added to the outer layers of fuser members to increase the thermal conductivity thereof. Examples of such fillers include conductive carbon, carbon black, graphite, aluminum oxide, titanium, and the like, as well as mixtures thereof. Efforts have been made to decrease the use of energy by providing a fuser member which has excellent thermal conductivity, thereby reducing the temperature needed to promote fusion of toner to paper. This increase in thermal conductivity also allows for increased speed of the fusing process by reducing the amount of time needed to heat the fuser member sufficiently to promote fusing. Efforts have also been made to increase the toughness of the fuser member layers to increase abrasion resistance and, accordingly, the life of the fuser member.

With regard to known fuser coatings, silicone rubber has been the preferred outer layer for fuser members in electrostatographic machines. Silicone rubbers interact well with various types of fuser release agents. Perfluoroalkoxypolytetrafluoroethylene (PFA Teflon), however, which is frequently used as an outer coating for fuser members, is more durable and abrasion resistant than silicone rubber coatings. Also, the surface energy for PFA Teflon is lower than that of silicone rubber coatings.

U.S. Pat. No. 5,864,740 (Heeks et al.), the disclosure of which is totally incorporated herein by reference, discloses a thermally stabilized silicone liquid composition and a toner fusing system using the thermally stabilized silicone liquid as a release agent, wherein the thermally stabilized silicone liquid contains a silicone liquid and a thermal stabilizer composition (including a reaction product from at least a polyorganosiloxane and a platinum metal compound (Group VIII compound) such as a ruthenium compound, excluding platinum.

U.S. Pat. No. 5,493,376 (Heeks), the disclosure of which is totally incorporated herein by reference, discloses a thermally stabilized polyorganosiloxane oil including a polyorganosiloxane oil and, as the thermal stabilizer, the reaction product of chloroplatinic acid and a member selected from the group consisting of a cyclic polyorganosiloxane having the formula

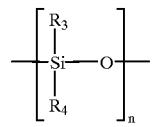

where $R_3$ is an alkyl radical having 1 to 6 carbon atoms and $R_4$ is selected from the group consisting of alkene and alkyne radicals having 2 to 8 carbon atoms, and n is from 3 to 6; a linear polyorganosiloxane having the formula

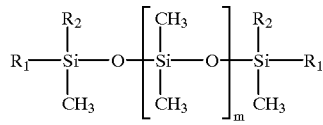

wherein $R_1$ and $R_2$ are selected from the group consisting of hydroxy and alkyl, alkoxy, alkene, and alkyne radicals having 1 to 10 carbon atoms, provided that at least one of $R_1$ and $R_2$ is alkene or alkyne, and m is from 0 to 50; and mixtures thereof, present in an amount to provide at least 5 parts per million of platinum in said oil.

U.S. Pat. No. 5,395,725 (Bluett et al.), the disclosure of which is totally incorporated herein by reference, discloses a process for fusing toner images to a substrate which comprises providing a fusing member having a fusing surface; heating the fuser member to an elevated temperature to fuse toner to the substrate; and applying directly to the fusing surface a fuser release agent oil blend composition; wherein volatile emissions arising from the fuser release agent oil blend are minimized or eliminated.

U.S. Pat. No. 4,150,181 (Smith), the disclosure of which is totally incorporated herein by reference, discloses a contact fuser assembly and method for preventing toner offset on a heated fuser member in an electrostatic reproducing apparatus which includes a base member coated with a solid, abrasion resistant material such as polyimide, poly(amide-imides), poly(imide-esters), polysulfones, and aromatic polyamides. The fuser member is coated with a thin layer of polysiloxane fluid containing low molecular weight fluorocarbon. Toner offset on the heated fuser member is prevented by applying the polysiloxane fluid containing fluorocarbon to the solid, abrasion resistant surface of the fuser member.

U.S. Pat. No. 3,002,927 (Awe et al.), the disclosure of which is totally incorporated herein by reference, discloses organosilicon fluids capable of withstanding high temperatures which are prepared by preoxygenating the fluid by heating a mixture of (1) a polysiloxane fluid in which the siloxane units are selected from the group consisting of units of the formula $R_3\ SiO_{0.5}$, $R_2\ SiO$, $RSiO_{1.5}$, and $SiO_2$ in which each R is selected from the group consisting of methyl, phenyl, chlorophenyl, fluorophenyl, and bromophenyl radicals, (2) a ferric salt of a carboxylic acid having from 4 to 18 carbon atoms in an amount such that there is from 0.005 to 0.03 percent by weight iron based on the weight of (1), and (3) oxygen mechanically dispersed in the fluid at a temperature above 400° F. until the mixture changes to a reddish brown color and until the mixture will not form a precipitate when heated in the absence of oxygen at a temperature above that at which the preoxygenation step is carried out.

U.S. Pat. No. 4,711,818 (Henry), the disclosure of which is totally incorporated herein by reference, discloses a thermally conductive dry release fuser member and fusing method for use in electrostatic reproducing machines without the application of a release agent. The fuser member comprises a base support member and a thin deformable layer of a composition coated thereon, the composition comprising the crosslinked product of a mixture of at least one addition curable vinyl terminated or vinyl pendant polyfluoroorganosiloxane, filler, heat stabilizer, a crosslinking agent, and a crosslinking catalyst.

U.S. Pat. No. 5,464,703 (Ferrar et al.) and U.S. Pat. No. 5,563,202 (Ferrar et al.), the disclosures of each of which are totally incorporated herein by reference, disclose a fuser member useful for heat fixing an electrographic toner to a substrate, a composition of matter, and its preparation method. The fuser member has a core and a base cushion layer overlying the core. The base cushion layer includes a crosslinked poly(dimethylsiloxane-fluoroalkylsiloxane) elastomer that has tin oxide particles dispersed therein in a concentration of from 20 to 40 percent of the total volume of the base cushion layer.

Copending Application U.S. Ser. No. 09/375,968, filed concurrently herewith, entitled "Thermally Stable Silicone Fluids," with the named inventors George J. Heeks, David J. Gervasi, Arnold W. Henry, and Santokh S. Badesha, the disclosure of which is totally incorporated herein by reference, discloses a fuser release agent comprising (a) a polyorganosiloxane, and (b) a stabilizing agent comprising the reaction product of (i) a metal acetylacetonate or metal oxalate compound, (ii) a linear unsaturated-alkyl-group-substituted polyorganosiloxane, and (iii) a cyclic unsaturated-alkyl-group-substituted polyorganosiloxane.

Copending Application U.S. Ser. No. 09/375,592, filed concurrently herewith, entitled "Stabilized Fluorosilicone Materials," with the named inventors George J. Heeks, David J. Gervasi, Arnold W. Henry, and Santokh S. Badesha, the disclosure of which is totally incorporated herein by reference, discloses a composition comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (ii) a metal acetylacetonate or metal oxalate compound.

Copending Application U.S. Ser. No., 09/325,974, filed concurrently herewith, entitled "Stabilized Fluorosilicone Transfer Member," with the named inventors George J. Heeks, David J. Gervasi, Arnold W. Henry, and Santokh S. Badesha, the disclosure of which is totally incorporated herein by reference, discloses a transfer member comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound, said transfer member having surface a resistivity of from about $10^4$ to about $10^{16}$ ohms per square.

Silicone rubbers are widely used in fusing subsystems, largely because they can be modified to optimum fusing properties. Desirable physical properties in fusing materials include thermal conductivity, hardness, and toughness. One disadvantage of using silicone rubbers is that silicone rubbers swell in various solvents and in silicone oils. In current release agent technology, silicone oils are commonly used, but because of the swelling of silicone rubber in the oil, it is often necessary to coat the silicone fuser rolls with a fluoropolymer. Fluorosilicones that will resist swelling and possess the preferred physical properties for fusing are also available, but fluorosilicones are unstable at high temperatures (for example, over 300° F.), and they can release trifluoropropionaldehyde, an acute nerve toxin.

Accordingly, while known compositions and processes are suitable for their intended purposes, a need remains for improved silicone rubber materials. In addition, a need remains for fuser member layers exhibiting thermal conductivity, hardness, and toughness. Further, there is a need for fuser member silicone rubber layers exhibiting reduced swelling in solvents and silicone oils. Additionally, there is a need for fuser member fluorosilicone rubber layers that are stable at high temperatures. There is also a need for fluorosilicone materials that exhibit improved stability at high temperatures. In addition, there is a need for fluorosilicone materials that emit reduced amounts of undesirable materials such as trifluoropropionaldehyde or formaldehyde at high temperatures. Further, there is a need for fluorosilicone fuser members with improved environmental, health, and safety characteristics.

SUMMARY OF THE INVENTION

The present invention is directed to a fuser member comprising a substrate and at least one layer thereover, said layer comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

DETAILED DESCRIPTION OF THE INVENTION

Figure 1:
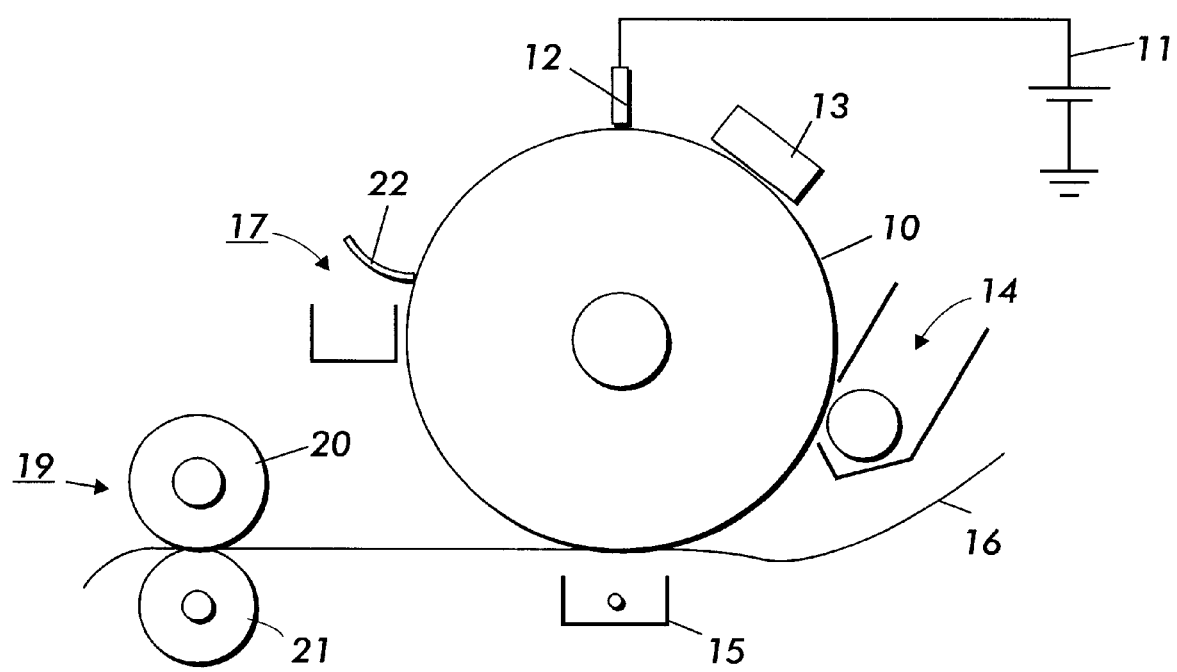
FIG. 1 is an illustration of a general electrostatographic apparatus.

Referring to FIG. 1, in a typical electrostatographic reproducing apparatus, a light image of an original to be copied is recorded in the form of an electrostatic latent image on a photosensitive member, and the latent image is subsequently rendered visible by the application of electroscopic thermoplastic resin particles, commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface in image configuration, they are transferred to a copy sheet 16 by transfer means 15, which can be pressure transfer, electrostatic transfer, or the like. Alternatively, the developed image can be transferred to an intermediate transfer member and subsequently transferred to a copy sheet.

After transfer of the developed image is completed, copy sheet 16 advances to fusing station 19, depicted in FIG. 1 as fusing and pressure rolls, wherein the developed image is fused to copy sheet 16 by passing copy sheet 16 between fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
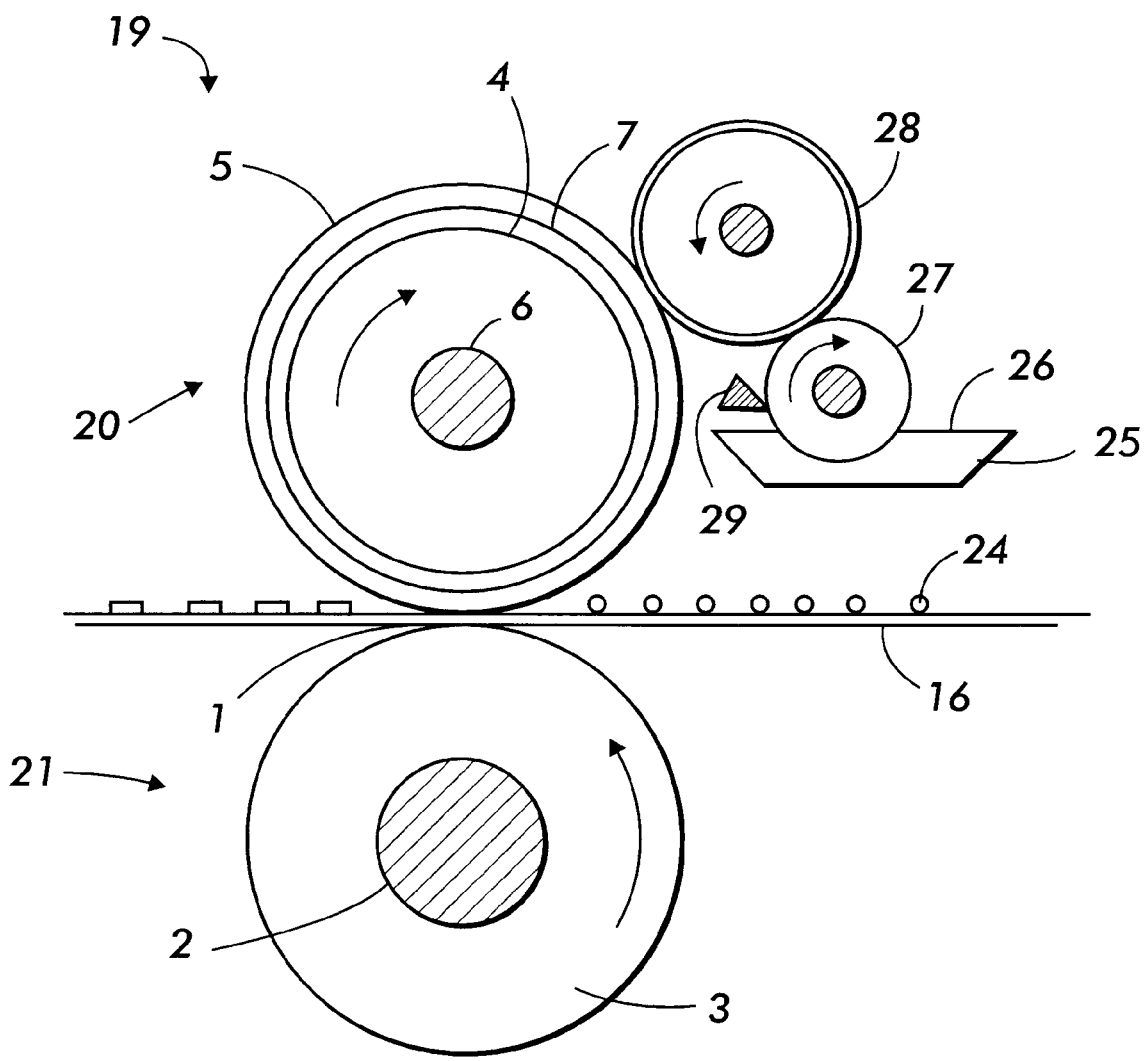
FIG. 2 illustrates a fusing system in accordance with an embodiment of the present invention.

Referring to FIG. 2, an embodiment of a fusing station 19 is depicted with an embodiment of a fuser roll 20 comprising thermally stabilized crosslinked fluorosilicone polymer surface 5 on a suitable base member or substrate 4, which in this embodiment is a hollow cylinder or core fabricated from any suitable metal, such as aluminum, anodized aluminum, steel, nickel, copper, or the like, having a suitable heating element 6 disposed in the hollow portion thereof which is coextensive with the cylinder. The fuser member 20 optionally can include an adhesive, cushion, or other suitable layer 7 positioned between core 4 and outer layer 5. Backup or pressure roll 21 cooperates with fuser roll 20 to form a nip or contact arc 1 through which a copy paper or other substrate 16 passes such that toner images 24 thereon contact polymer or elastomer surface 5 of fuser roll 20. As shown in FIG. 2, an embodiment of a backup roll or pressure roll 21 is depicted as having a rigid steel core 2 with a polymer or elastomer surface or layer 3 thereon. Optional sump 25 contains optional polymeric release agent 26, which may be a solid or liquid at room temperature, but is a fluid at operating temperatures. The pressure member 21 can also optionally include a heating element (not shown).

In the embodiment shown in FIG. 2 for applying the polymeric release agent 26 to polymer or elastomer surface 5, two release agent delivery rolls 27 and 28 rotatably mounted in the direction indicated are provided to transport release agent 26 to polymer or elastomer surface 5. Delivery roll 27 is partly immersed in the sump 25 and transports on its surface release agent from the sump to the delivery roll 28. By using a metering blade 29, a layer of polymeric release fluid can be applied initially to delivery roll 27 and subsequently to polymer or elastomer 5 in controlled thickness ranging from submicron thickness to thicknesses of several microns of release fluid. Thus, by metering device 29, preferably from about 0.1 to about 2 microns or greater thicknesses of release fluid can be applied to the surface of polymer 5.

Figure 3:
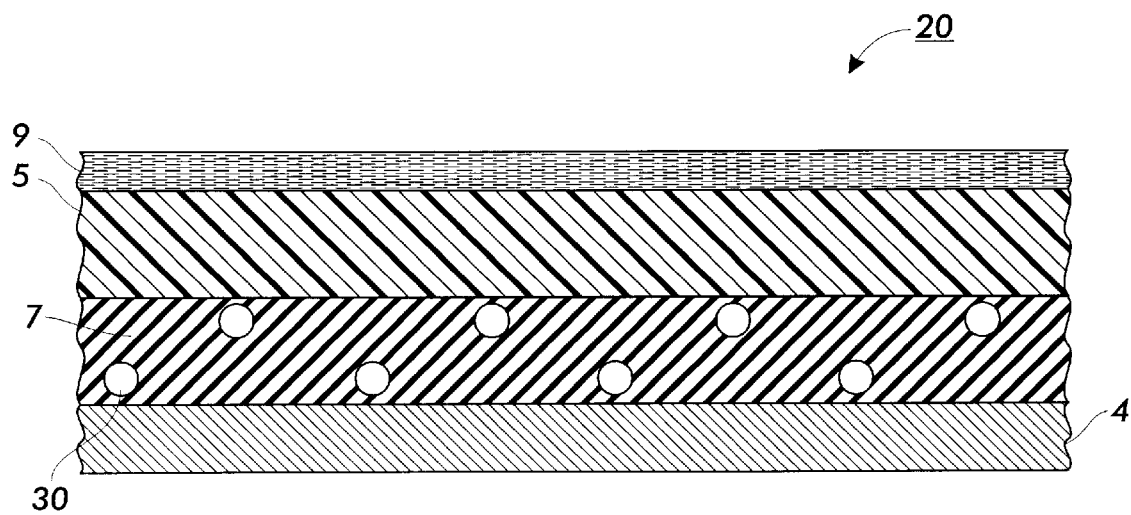
FIG. 3 demonstrates a cross-sectional view of an embodiment of the present invention.

FIG. 3 depicts a cross-sectional view of another embodiment of the invention, wherein fuser member 20 comprises substrate 4, optional intermediate surface layer 7 comprising silicone rubber and optional fillers 30, such as aluminum oxide or the like, dispersed or contained therein, and outer thermally stabilized crosslinked fluorosilicone polymeric surface layer 5. FIG. 3 also depicts fluid release agent or fusing oil layer 9.

The term "fuser member" as used herein refers to fuser members including fusing rolls, belts, films, sheets, and the like; donor members, including donor rolls, belts, films, sheets, and the like; and pressure members, including pressure rolls, belts, films, sheets, and the like; and other members useful in the fusing system of an electrostatographic or xerographic, including digital, machine. The fuser member of the present invention can be employed in a wide variety of machines, and is not specifically limited in its application to the particular embodiment depicted herein.

Any suitable substrate can be selected for the fuser member. The fuser member substrate can be a roll, belt, flat surface, sheet, film, or other suitable shape used in the fixing of thermoplastic toner images to a suitable copy substrate. It can take the form of a fuser member, a pressure member, or a release agent donor member, preferably in the form of a cylindrical roll. Typically, the fuser member is made of a hollow cylindrical metal core, such as copper, aluminum, stainless steel, or certain plastic materials chosen to maintain rigidity and structural integrity, as well as being capable of having a polymeric material coated thereon and adhered firmly thereto. It is preferred that the supporting substrate is a cylindrical sleeve, preferably with an outer polymeric layer of from about 1 to about 6 millimeters. In one embodiment, the core, which can be an aluminum or steel cylinder, is degreased with a solvent and cleaned with an abrasive cleaner prior to being primed with a primer, such as Dow Corning® 1200, which can be sprayed, brushed, or dipped, followed by air drying under ambient conditions for thirty minutes and then baked at 150° C. for 30 minutes.

Also suitable are quartz and glass substrates. The use of quartz or glass cores in fuser members allows for a light weight, low cost fuser system member to be produced. Moreover, the glass and quartz help allow for quick warm-up, and are therefore energy efficient. In addition, because the core of the fuser member comprises glass or quartz, there is a real possibility that such fuser members can be recycled. Moreover, these cores allow for high thermal efficiency by providing superior insulation.

When the fuser member is a belt, the substrate can be of any desired or suitable material, including plastics, such as Ultem®, available from General Electric, Ultrapek®, available from BASF, PPS (polyphenylene sulfide) sold under the tradenames Fortron®, available from Hoechst Celanese, Ryton R-4®, available from Phillips Petroleum, and Supec®, available from General Electric; PAI (polyamide imide), sold under the tradename Torlon® 7130, available from Amoco; polyketone (PK), sold under the tradename Kadel® E1230, available from Amoco; PI (polyimide); polyaramide; PEEK (polyether ether ketone), sold under the tradename PEEK 450GL30, available from Victrex; polyphthalamide sold under the tradename Amodel®, available from Amoco; PES (polyethersulfone); PEI (polyetherimide); PAEK (polyaryletherketone); PBA (polyparabanic acid); silicone resin; and fluorinated resin, such as PTFE (polytetrafluoroethylene); PFA (perfluoroalkoxy); FEP (fluorinated ethylene propylene); liquid crystalline resin (Xydar®), available from Amoco; and the like, as well as mixtures thereof. These plastics can be filled with glass or other minerals to enhance their mechanical strength without changing their thermal properties. In preferred embodiments, the plastic comprises a high temperature plastic with superior mechanical strength, such as polyphenylene sulfide, polyamide imide, polyimide, polyketone, polyphthalamide, polyether ether ketone, polyethersulfone, and polyetherimide. Suitable materials also include silicone rubbers. Examples of belt-configuration fuser members are disclosed in, for example, U.S. Pat. No. 5,487,707, U.S. Pat. No. 5,514,436, and Copending Application U.S. Ser. No. 08/297,203, filed Aug. 29, 1994, the disclosures of each of which are totally incorporated herein by reference. A method for manufacturing reinforced seamless belts is disclosed in, for example, U.S. Pat. No. 5,409,557, the disclosure of which is totally incorporated herein by reference.

The optional intermediate layer can be of any suitable or desired material. For example, the optional intermediate layer can comprise a silicone rubber of a thickness sufficient to form a conformable layer. Suitable silicone rubbers include room temperature vulcanization (RTV) silicone rubbers, high temperature vulcanization (HTV) silicone rubbers, and low temperature vulcanization (LTV) silicone rubbers. These rubbers are known and are readily available commercially such as SILASTIC® 735 black RTV and SILASTIC® 732 RTV, both available from Dow Corning, and 106 RTV Silicone Rubber and 90 RTV Silicone Rubber, both available from General Electric. Other suitable silicone materials include the silanes, siloxanes (preferably polydimethylsiloxanes), such as fluorosilicones, dimethylsilicones, liquid silicone rubbers, such as vinyl crosslinked heat curable rubbers or silanol room temperature crosslinked materials, and the like. Other materials suitable for the intermediate layer include polyimides and fluoroelastomers, including those commonly used as fuser member outer layers. If desired, the intermediate layer can comprise a fluorosilicone with a thermal stabilizer according to the present invention.

Silicone rubber materials can swell during the fusing process, especially in the presence of a release agent. In the case of fusing color toner, normally a relatively larger amount of release agent is necessary to enhance release because of the need for a larger amount of color toner than is required for black and white copies and prints. Accordingly, the silicone rubber is more susceptible to swell in an apparatus using color toner. Aluminum oxide added in a relatively small amount can reduce the swell and increase the transmissibility of heat. This increase in heat transmissibility is preferred in fusing members useful in fusing color toners, since a higher temperature (for example, from about 155 to about 180° C.) is usually needed to fuse color toner, compared to the temperature required for fusing black and white toner (for example, from about 50 to about 180° C.).

Accordingly, optionally dispersed or contained in the intermediate silicone rubber layer is aluminum oxide in a relatively low amount of from about 0.05 to about 5 percent by volume, preferably from about 0.1 to about 5 percent by volume, and more preferably from about 2.2 to about 2.5 percent by total volume of the intermediate layer. In addition to the aluminum oxide, other metal oxides and/or metal hydroxides can be used. Such metal oxides and/or metal hydroxides include tin oxide, zinc oxide, calcium hydroxide, magnesium oxide, lead oxide, chromium oxide, copper oxide, and the like, as well as mixtures thereof, In a preferred embodiment, a metal oxide is present in an amount of from about 10 to about 50 percent by volume, preferably from about 20 to about 40 percent by volume, and more preferably from about 30 to about 35 percent by total volume of the intermediate layer. In a preferred embodiment copper oxide is used in these amounts in addition to the aluminum oxide. In a particularly preferred embodiment, copper oxide is present in an amount of from about 30 to about 35 percent by volume and aluminum oxide is present in an amount of from about 2.2 to about 2.5 percent by total volume of the intermediate layer. In preferred embodiments, the average particle diameter of the metal oxides such as aluminum oxide or copper oxide preferably is from about 1 to about 10 microns, and more preferably from about 3 to about 5 microns, although the average particle diameter can be outside of these ranges.

The optional intermediate layer typically has a thickness of from about 0.05 to about 10 millimeters, preferably from about 0.1 to about 5 millimeters, and more preferably from about 1 to about 3 millimeters, although the thickness can be outside of these ranges. More specifically, if the intermediate layer is present on a pressure member, it typically has a thickness of from about 0.05 to about 5 millimeters, preferably from about 0.1 to about 3 millimeters, and more preferably from about 0.5 to about 1 millimeter, although the thickness can be outside of these ranges. When present on a fuser member, the intermediate layer typically has a thickness of from about 1 to about 10 millimeters, preferably from about 2 to about 5 millimeters, and more preferably from about 2.5 to about 3 millimeters, although the thickness can be outside of these ranges. In a preferred embodiment, the thickness of the intermediate layer of the fuser member is higher than that of the pressure member, so that the fuser member is more deformable than the pressure member.

The outer fusing layer of the fuser member of the present invention comprises a crosslinked fluorosilicone polymer. This layer is prepared by first preparing a liquid composition containing the uncrosslinked fluorosilicone polymer, a crosslinking agent, and a thermal stabilizer according to the present invention as disclosed hereinbelow, as well as any desired optional fillers or other optional components. The liquid composition is applied to the substrate, followed by crosslinking of the fluorosilicone polymer, typically by heating to a temperature of from about 200 to about 400° F., although the temperature can be outside of this range, and typically for from about 10 to about 30 minutes, although the time can be outside of this range, and although other crosslinking methods can also be employed.

Examples of suitable fluorosilicones (prior to crosslinking) for the outer fusing layer of the fuser member include, but are not limited to, those of the general formula

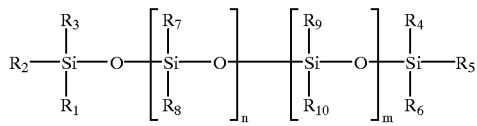

wherein each of $R_1$, $R_2$, $R_3$, $R_4$, $R_5$, $R_6$, $R_7$, $R_8$, $R_9$, and $R_{10}$, independently of the others, is an alkyl group, including linear, branched, cyclic, unsaturated, and substituted alkyl groups, typically with from 1 to about 18 carbon atoms, preferably with from 1 to about 8 carbon atoms, more preferably with from 1 to about 6 carbon atoms, and even more preferably with from 1 to about 3 carbon atoms, although the number of carbon atoms can be outside of these ranges, an aryl group, including substituted aryl groups, typically with from 6 to about 18 carbon atoms, preferably with from 6 to about 10 carbon atoms, and even more preferably with from 6 to about 8 carbon atoms, although the number of carbon atoms can be outside of this range, or an arylalkyl group (with either the alkyl or the aryl portion of the group being attached to the silicon atom), including substituted arylalkyl groups, typically with from 7 to about 18 carbon atoms, preferably with from 7 to about 12 carbon atoms, and more preferably with from 7 to about 9 carbon atoms, although the number of carbon atoms can be outside of these ranges, provided that at least one of $R_9$ and $R_{10}$ is a fluoro-substituted alkyl, aryl, or arylalkyl group. The average fluorine content of the polyorganosiloxane molecules in the uncrosslinked liquid typically is from about 5 to about 71 percent by weight, although the fluorine content can be outside of this range. Further, m and n are each integers representing the number of repeat monomer units; typically, m is from 0 to about 1,000 and n is from 1 to about 1,000, with the sum of m+n typically being from about 50 to about 5,000, preferably from about 50 to about 1,000, and more preferably from about 50 to about 200, although the number of repeat monomer units can be outside of this range. These polymers generally are random copolymers of substituted and unsubstituted siloxane repeat units, although alternating, graft, and block copolymers are also suitable. The fluorosilicones (prior to crosslinking) for the outer fusing layer of the fuser member are of any suitable or desired effective weight average molecular weight, typically from about 3,600 to about 80,000, and preferably from about 6,000 to about 70,000, and more preferably from about 10,000 to about 30,000, although the weight average molecular weight can be outside of these ranges. Typical number average molecular weights are from about 5,000 to about 20,000, although the number average molecular weight can be outside of this range.

Specific examples of suitable materials of this formula include those of the formula

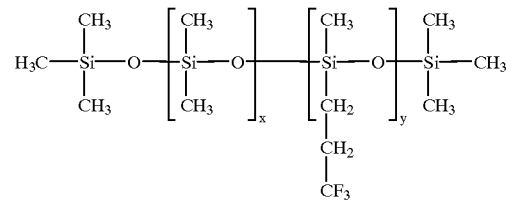

wherein x and y are integers representing the number of repeat monomer units, those of the above formula wherein at least two of the methyl groups are replaced with vinyl groups, as disclosed in, for example, U.S. Pat. No. 4,711,818, the disclosure of which is totally incorporated herein by reference, those of the general formula

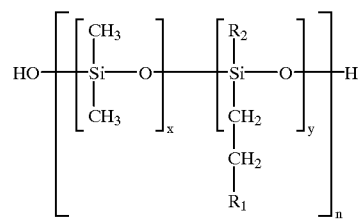

wherein $R_1$ is a fluoroalkyl group having from about 1 to 18 carbon atoms and from about 3 to 37 fluorine atoms, $R_2$ is an alkyl group having from 1 to 6 carbon atoms, the ratio of x:y is from about 99:1 to about 70:30, and n is an integer such that, before crosslinking, the polymer has a number average molecular weight of from about $1 \times 10^3$ to about $1 \times 10^6$, as disclosed in, for example, U.S. Pat. No. 5,464,703 and U.S. Pat. No. 5,563,202, the disclosures of each of which are totally incorporated herein by reference, other condensation polymers prepared by the condensation reaction of difunctional dialkylsiloxane monomers or oligomers and difunctional fluoroalkylsilane monomers or oligomers, and the like. Specific examples of suitable commercially available fluorosilicones include those available from United Chemical, Piscataway, N.J., the SILASTIC fluorosilicone materials available from Dow Corning Co., Midland, Mich., other fluorosilicones such as nonylfluorohexyl and fluorosiloxanes, including DC94003 and Q5-8601, both available from Dow Corning Co., Midland, Mich., the FSL fluorosilicone materials available from General Electric Corp., Schenectady, N.Y., the Shin-Etsu Fluorosilicone Elastomers, available from Shincor Silicones, Inc., Akron, Ohio, and the like.

Any desired or effective crosslinking agent can be employed. Examples of suitable crosslinking agents include, but are not limited to, hydrogen peroxide, organic peroxides commonly used as crosslinking agents, organic diamine curatives, such as hexamethylene diamine carbamate and N,N'-dicinnamylidene-1,6-hexanediamine (commercially available from E.I. DuPont de Nemours and Co. as Diak® No. 1 and Diak® No. 3, respectively), and the like. The crosslinking agent is present in the liquid composition comprising the fluorosilicone in any desired or effective amount, typically from about 1 to about 10 percent by weight of the fluorosilicone polymer, although the amount can be outside of this range.

The thermal stabilizing agent present in the outer layer of the fuser members of the present invention is a reaction product of a cyclic unsaturated-alkyl-group-substituted polyorganosiloxane, a linear unsaturated-alkyl-group-substituted polyorganosiloxane, and a metal-bidentate ligand compound. The bidentate ligand compound is a metal acetylacetonate compound, of the general formula

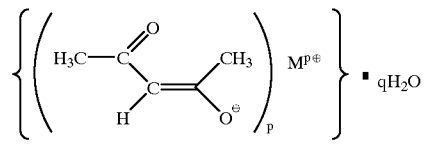

or a metal oxalate compound, of the general formula

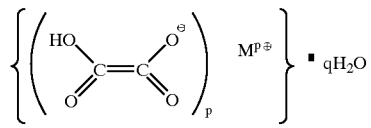

wherein M represents a divalent or trivalent metal ion, p is an integer representing the charge on the metal ion and is 2 or 3, and q is an integer representing the number of complexed hydrate groups in the compound, and typically ranges from 0 to about 20. Examples of suitable metal ions include (but are not limited to) $Zr^{2+}$, $Zn^{2+}$, $Fe^{2+}$, $Fe^{3+}$, $Ce^{3+}$, $Cr^{2+}$, $Cr^{3+}$, and the like. One particularly preferred metal-bidentate ligand compound is cerium (III) acetylacetonate hydrate, available from, for example, Aldrich Chemical Co., Milwaukee, Wis. The metal-bidentate ligand compound is present in the stabilizing agent in any suitable or effective amount, typically from about 9 to about 59 parts by weight for every 4 to 30 parts by weight of the cyclic unsaturated-alkyl-group-substituted polyorganosiloxane and for every 4 to 30 parts by weight of the linear unsaturated-alkyl-group-substituted polyorganosiloxane, preferably from about 25 to about 42 parts by weight for every 10 to 22 parts by weight of the cyclic unsaturated-alkyl-group-substituted polyorganosiloxane and every 10 to 22 parts by weight of the linear unsaturated-alkyl-group-substituted polyorganosiloxane, and more preferably about 34 parts by weight for every 17 parts by weight of the cyclic unsaturated-alkyl-group-substituted polyorganosiloxane and every 17 parts by weight of the linear unsaturated-alkyl-group-substituted polyorganosiloxane, although the relative amounts can be outside of these ranges. Expressed another way, the stabilizing agent typically is prepared by beginning with a base of 100 centistoke nonfunctional polydimethyl siloxane oil to facilitate mixing of the ingredients. The stabilizer components are then added to this base. For every 100 parts by weight of the nonfunctional polydimethylsiloxane, typically there are from about 9 to about 59 parts by weight of the metal-bidentate ligand compound, from about 4 to about 30 parts by weight of the cyclic unsaturated-alkyl-group-substituted polyorganosiloxane, and from about 4 to about 30 parts by weight of the linear unsaturated-alkyl-group-substituted polyorganosiloxane. Preferably, for every 100 parts by weight of the nonfunctional polydimethylsiloxane, typically there are from about 25 to about 42 parts by weight of the metal-bidentate ligand compound, from about 10 to about 22 parts by weight of the cyclic unsaturated-alkyl-group-substituted polyorganosiloxane, and from about 10 to about 22 parts by weight of the linear unsaturated-alkyl-group-substituted polyorganosiloxane. More preferably, for every 100 parts by weight of the nonfunctional polydimethylsiloxane, typically there are about 34 parts by weight of the metal-bidentate ligand compound, about 17 parts by weight of the cyclic unsaturated-alkyl-group-substituted polyorganosiloxane, and about 17 parts by weight of the linear unsaturated-alkyl-group-substituted polyorganosiloxane. Again, the relative amounts can be outside of these ranges.

The linear unsaturated-alkyl-group-substituted polyorganosiloxane typically is of the general formula

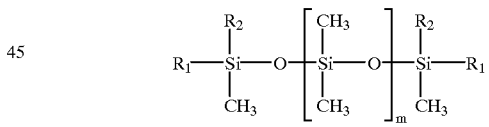

wherein $R_1$ and $R_2$ are selected from the group consisting of hydroxy and alkyl, alkoxy, alkene, and alkyne radicals having from 1 to about 10 carbon atoms, provided that at least one of $R_1$ and $R_2$ is alkene or alkyne, and m is an integer representing the number of repeat monomer units, typically being from 0 to about 350, preferably from about 50 to about 325, and more preferably from about 100 to about 300, although the value of m can be outside of this range. Specific examples of suitable linear unsaturated-alkyl-group-substituted polyorganosiloxanes include materials such as $(CH_2=CH)(CH_3)_2SiOSi(CH_3)_2(CH=CH_2)$(1, 3-divinyl tetramethyl disiloxane), $(CH_2=CHCH_2)_2(CH)SiOSi(CH_3)(CH_2CH=CH_2)_2$(1,1,3,3-tetraally-1,3-dimethyl disiloxane), $(CH_2=CH)(CH_3)(HO)SiOSi(OH)(CH_3)(CH=CH_2)$ (1,3-divinyl-1,3-dimethyl-1,3-dihydroxy disiloxane, $(CH_2=CH)(CH_3)_2SiO(SiO(CH_3)_2)Si(CH_3)_2(CH=CH_2)$ (polydimethyl siloxane, vinyl dimethyl terminated, wherein n varies from 1 to about 50, all available from United Chemical Technologies, Piscataway, N.J., and the like, as well as mixtures thereof. One particularly preferred linear unsaturated-alkyl-group-substituted polyorganosiloxane is a vinyl dimethyl terminated polyorganosiloxane, such as those available from, for example, United Chemical Technologies, Piscataway, N.J., as PS496, believed to be of the general formula

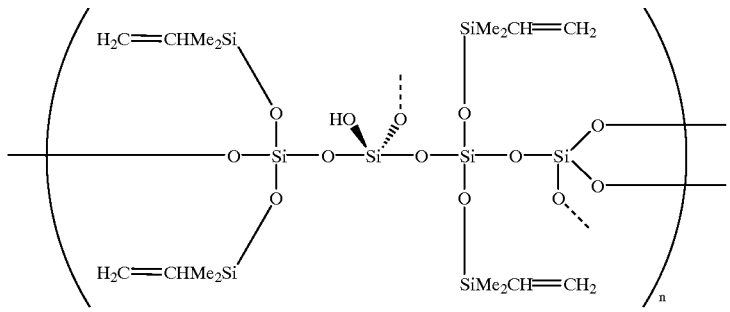

wherein n is an integer representing the number of repeat monomer units, and typically is from about 100 to about 325, and preferably from about 200 to about 300, although the value of n can be outside of these ranges.

The cyclic unsaturated-alkyl-group-substituted polyorganosiloxane typically is of the general formula

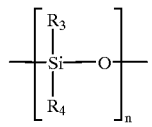

wherein $R_3$ is an alkyl radical, typically having from 1 to about 6 carbon atoms, or an alkene or alkyne radical, typically having from 2 to about 8 carbon atoms, $R_4$ is an alkene or alkyne radical, typically having from 2 to about 8 carbon atoms, and n is an integer of from about 3 to about 6. Specific examples of suitable cyclic polyorganosiloxanes include alkenylcyclosiloxanes, such as $(CH_2=CH(CH_3)SiO)_3$ (1,3,5-triethenyltrimethylcyclotrisiloxane), $(CH_2=CH(CH_3)SiO)_4$ (1,3,5,7-tetraethenyltetramethylcyclotetrasiloxane), $(CH_2=CHCH_2(CH_3)SiO)_4$ (1,3,5,7-tetrallyltetramethylcyclotetrasiloxane), $(CH_2=CH(CH_3)SiO)_6$ (1,3,5,7,9,11-hexaethenylhexamethylcyclohexasiloxane, all available from United Chemical Technologies, and the like, as well as mixtures thereof. One particularly preferred cyclic unsaturated-alkyl-group-substituted polyorganosiloxane is 1,3,5,7-tetravinyl tetramethyl cyclotetrasiloxane, believed to be of the formula

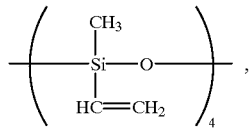

commercially available from, for example, United Chemical Technologies, Piscataway, N.J. as T2160.

Optionally, the stabilizing agent can also contain a nonfunctional polyorganosiloxane oil, such as polydimethylsiloxane; this component is frequently added to the other stabilizing agent ingredients to enhance ease of mixing thereof.

The stabilizing agent can be prepared by any suitable or effective method. For example, the stabilizing agent can be prepared by admixing all of the stabilizer ingredients (i.e., metal-bidentate ligand compound, linear unsaturated-alkyl-group-substituted polyorganosiloxane, and cyclic unsaturated-alkyl-group-substituted polyorganosiloxane), if desired in a base material to facilitate mixing, such as a nonfunctional polydimethylsiloxane oil, agitating the resulting dispersion (in, for example, a ball mill) for from about 1 to about 3 days, subsequently heating the dispersion to a temperature of from about 150 to about 400° F. for from about 1 to about 8 hours, and filtering the dispersion, through, for example, Whatman no. 2 filter paper to obtain the stabilizing agent. The stabilizing agent is then added to the polyorganosiloxane (silicone) oil to obtain a thermally stable material.

The thermal stabilizing agent is present in the liquid composition for the outer layer of the fuser member of the present invention in any desired or effective amount, typically from about 0.01 to about 10 parts per hundred by weight of the liquid composition, preferably from about 0.1 to about 5 parts per hundred by weight of the liquid composition, and more preferably from about 0.5 to about 2.5 parts per hundred by weight of the liquid composition, and even more preferably from about 1 to about 2 parts per hundred by weight of the liquid composition, although the amount can be outside of these ranges.

Optionally, conductive fillers can be dispersed in the outer fusing layer of the fuser member, particularly in embodiments wherein a functional fuser oil is used. Preferred fillers are capable of interacting with the functional groups of the release agent to form a thermally stable film which releases the thermoplastic resin toner and prevents the toner from contacting the filler surface material itself. This bonding enables a reduction in the amount of oil needed to promote release. Further, preferred fillers promote bonding with the oil without causing problems such as scumming or gelling. In addition, it is preferred that the fillers be substantially non-reactive with the outer polymer material so that no adverse reaction occurs between the polymer material and the filler which would hinder curing or otherwise negatively affect the strength properties of the outer surface material. Fillers in the outer fusing layer can also increase thermal conductivity.

Other optional adjuvants and fillers can be incorporated in the polymer of the outer fusing layer according to the present invention, provided that they do not affect the integrity of the polymer material. Such fillers normally encountered in the compounding of elastomers include coloring agents, reinforcing fillers, processing aids, accelerators, and the like. Oxides, such as magnesium oxide, and hydroxides, such as calcium hydroxide, are suitable for use in curing many fluoroelastomers. Proton acids, such as stearic acid, are suitable additives in EPDM and BR polymer formulations to improve release by improving bonding of amino oils to the elastomer composition. Other metal oxides, such as cupric oxide and/or zinc oxide, can also be used to improve release. Metal oxides, such as copper oxide, aluminum oxide, magnesium oxide, tin oxide, titanium oxide, iron oxide, zinc oxide, manganese oxide, molybdenum oxide, and the like, carbon black, graphite, metal fibers and metal powder particles such as silver, nickel, aluminum, and the like, as well as mixtures thereof, can promote thermal conductivity. The addition of silicone particles to a fluoropolymer outer fusing layer can increase release of toner from the fuser member during and following the fusing process. Processability of a fluoropolymer outer fusing layer can be increased by increasing absorption of silicone oils, in particular by adding fillers such as fumed silica or clays such as organo-montmorillonites. Inorganic particulate fillers can increase the abrasion resistance of the polymeric outer fusing layer. Examples of such fillers include metal-containing fillers, such as a metal, metal alloy, metal oxide, metal salt, or other metal compound; the general classes of suitable metals include those metals of Groups 1$b$, 2$a$, 2$b$, 3$a$, 3$b$, 4$a$, 4$b$, 5$a$, 5$b$, 6$b$, 7$b$, 8, and the rare earth elements of the Periodic Table. Specific examples of such fillers are oxides of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel, and alloys thereof. Also suitable are reinforcing calcined alumina and non-reinforcing tabular alumina.

The polymer layers of the fuser member can be coated on the fuser member substrate by any desired or suitable means, including normal spraying, dipping, and tumble spraying techniques. A flow coating apparatus as described in Copending Application U.S. Ser. No. 08/672,493 filed Jun. 26, 1996, pending, entitled "Flow Coating Process for Manufacture of Polymeric Printer Roll and Belt Components," the disclosure of which is totally incorporated herein by reference, can also be used to flow coat a series of fuser rolls. It is preferred that the polymers be diluted with a solvent, and particularly an environmentally friendly solvent, prior to application to the fuser substrate. Alternative methods, however, can be used for coating layers, including methods described in Copending Application U.S. Ser. No. 09/069,476, filed Apr. 29, 1998, pending, entitled "Method of Coating Fuser Members," the disclosure of which is totally incorporated herein by reference.

Other optional layers, such as adhesive layers or other suitable cushion layers or conductive layers, can also be incorporated between the outer elastomer layer and the substrate. Optional intermediate adhesive layers and/or polymer layers can be applied to achieve desired properties and performance objectives. An adhesive intermediate layer can be selected from, for example, epoxy resins and polysiloxanes. Preferred adhesives include materials such as Union Carbide A-1100, Dow TACTIX 740, Dow TACTIX 741, Dow TACTIX 742, Dow Corning P5200, Dow Corning S-2260, Union Carbide A-1100, and United Chemical Technologies A0728. A particularly preferred curative for the aforementioned adhesives is Dow H41. Preferred adhesive (s) for silicone adhesion are A4040 silane, available from Dow Corning Corp., Midland, Mich. 48686, D.C. 1200, also available from Dow Corning, and S-11 silane, available from Grace Specialty Polymers, Lexington, Mass. Adhesion of fluorocarbon elastomers can be accomplished with Chemlok® 5150, available from Lord Corp., Coating and Lamination Division, Erie, Pa.

Polymeric fluid release agents can optionally be used in combination with the polymer outer layer to form a layer of fluid release agent which results in an interfacial barrier at the surface of the fuser member while leaving a non-reacted low surface energy release fluid as an outer release film. Suitable release agents include both functional and non-functional fluid release agents. The term "nonfunctional oil" as used herein refers to oils which do not react chemically with the fillers on the surface of the fuser member. The term "functional oil" as used herein refers to a release agent having functional groups which react chemically with the fillers present on the surface of the fuser member so as to reduce the surface energy of the fillers and thereby provide better release of toner particles from the surface of the fuser member. Non-functional release agents include known polydimethyl siloxane release agents. Functional release agents such as amino functional, mercapto functional, hydride functional, and others, can also be used. Specific examples of suitable amino functional release agents include T-Type amino functional silicone release agents, as disclosed in, for example U.S. Pat. No. 5,516,361, monoamino functional silicone release agents, as described in, for example U.S. Pat. No. 5,531,813, and amino functional siloxane release agents, as disclosed in, for example, U.S. Pat. No. 5,512, 409, the disclosures of each of which are totally incorporated herein by reference. Examples of mercapto functional release agents include those disclosed in, for example, U.S. Pat. No. 4,029,827, U.S. Pat. No. 4,029,827, and U.S. Pat. No. 5,395,725, the disclosures of each of which are totally incorporated herein by reference. Examples of hydride functional oils include those disclosed in, for example, U.S. Pat. No. 5,401,570, the disclosure of which is totally incorporated herein by reference. Other functional release agents include those described in, for example, U.S. Pat. No. 4,101,686, U.S. Pat. No. 4,146,659, and U.S. Pat. No. 4,185,140, the disclosures of each of which are totally incorporated herein by reference. Other release agents include those described in, for example, U.S. Pat. No. 4,515,884 and U.S. Pat. No. 5,493,376, the disclosures of each of which are totally incorporated herein by reference.

Preferred polymeric fluid release agents to be used in combination with the polymeric layer are those comprising molecules having functional groups which interact with any filler particles in the fuser member and also interact with the polymer itself in such a manner as to form a layer of fluid release agent that results in an interfacial barrier at the surface of the fuser member while leaving a non-reacted low surface energy release fluid as an outer release film. Suitable release agents include polydimethylsiloxane fusing oils having amino, mercapto, and other functionality for fluoroelastomer compositions. For silicone based compositions, a nonfunctional oil can also be used. The release agent can further comprise nonfunctional oil as a diluent.

While the crosslinked fluorosilicones of the present invention have been described with respect to their suitability for use as fuser member layers, the crosslinked fluorosilicones of the present invention are also suitable for use in any other application wherein materials possessing release or solvent resistance properties exhibited by fluorosilicone elastomers are desirable, such as intermediate transfer belt materials and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Three 21 milliliter headspace vials, each containing 1 gram of GE Silicones Silanol/STPD Fluorosilicone Fluid, were prepared by placing them in a 400° F. oven for 1 week. Thereafter, the vials were analyzed by heating them in a 400° F. oven for 10 minutes. One vial was used as a control sample with no additives. The second vial contained the fluorosilicone with 2 parts per hundred by weight of a thermal stabilizing agent according to the present invention, said thermal stabilizing agent was prepared by admixing 10 grams of cerium (III) acetylacetonate (obtained from Aldrich Chemical Co., Milwaukee, Wis.), 5 grams of vinyl Q-resin (obtained from United Chemical Technologies, Piscataway, N.J.), 5 grams of tetravinyl tetramethyl cyclotetrasiloxane (Vinyl Q-Resin dispersion, obtained from United Chemical Technologies, Piscataway, N.J.), and 40 grams of nonfunctional polydimethylsiloxane (obtained from Xerox Corp., with a viscosity of 100 centiStokes), followed by ball milling at 400° F. for 2.5 hours and subsequent filtering. The third vial contained the fluorosilicone with 2 parts per hundred by weight of a thermal stabilizing agent similar to that in the second vial (and prepared the same way as that in the second vial) except that the thermal stabilizing agent contained no tetravinyl tetramethyl cyclotetrasiloxane. Subsequent to heating at 400° F. for 10 minutes, 2 milliliter volumes of the headspace gases were removed from each of the three vials with gas tight syringes and analyzed by GC/MS on a Finnigan Incos 50 mass spectrometer system. The oven of the gas chromatograph was programmed from 45 to 245° C. at 6° C. per minute and a 30 meter DB-5 column (0.25 millimeter inner diameter) was used. Based on the peak areas of the 64 m/z ion of trifluoropropionaldehyde, the relative amounts of trifluoropropionaldehyde present in the headspace gases of each vial were as follows:

| Vial | Relative Amount TFPA |
|------|----------------------|
| 1    | 268,172              |
| 2    | 35,600               |
| 3    | 549,559              |

As the data indicate, the vial containing the thermally stabilized fluorosilicone according to the present invention exhibited greatly reduced trifluoropropionaldehyde emissions compared to the control and to the vial containing no tetravinyl tetramethyl cyclotetrasiloxane. Similar results are expected for the solid stabilized crosslinked fluorosilicone materials.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A fuser member comprising a substrate and at least one layer thereover, said layer comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

2. A fuser member according to claim 1 wherein the fluorosilicone is of the formula

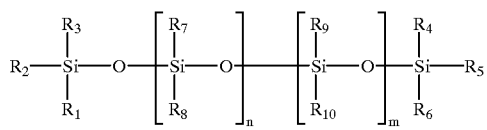

wherein each of $R_1$, $R_2$, $R_3$, $R_4$, $R_5$, $R_6$, $R_7$, $R_8$, $R_9$, and $R_{10}$, independently of the others, is an alkyl group, an aryl group, or an arylalkyl group, provided that at least one of $R_9$ and $R_{10}$ is a fluoro-substituted alkyl, aryl, or arylalkyl group, and m and n are each integers representing the number of repeat monomer units.

3. A fuser member according to claim 1 wherein the average fluorine content of the fluorosilicone is from about 5 to about 71 percent by weight.

4. A fuser member according to claim 1 wherein the fluorosilicone has a weight average molecular weight of from about 3,600 to about 80,000.

5. A fuser member according to claim 1 wherein the crosslinking agent is a peroxide or an organic diamine curative.

6. A fuser member according to claim 1 wherein the crosslinking agent is present in the liquid in an amount of from about 1 to about 10 percent by weight of the fluorosilicone polymer.

7. A fuser member according to claim 1 wherein the thermal stabilizing agent is a reaction product of (i) a cyclic unsaturated-alkyl-group-substituted polyorganosiloxane, (ii) a linear unsaturated-alkyl-group-substituted polyorganosiloxane, and (iii) a metal acetylacetonate compound.

8. A fuser member according to claim 1 wherein the thermal stabilizing agent is a reaction product of (i) a cyclic unsaturated-alkyl-group-substituted polyorganosiloxane, (ii) a linear unsaturated-alkyl-group-substituted polyorganosiloxane, and (iii) a metal oxalate compound.

9. A fuser member according to claim 1 wherein the metal of the metal acetylacetonate or metal oxide compound is $Zr^{2+}$, $Zn^{2+}$, $Fe^{2+}$, $Fe^{3+}$, $Ce^{3+}$, $Cr^{2+}$, $Cr^{3+}$, or mixtures thereof.

10. A fuser member according to claim 1 wherein the metal acetylacetonate or metal oxide compound is cerium (III) acetylacetonate hydrate.

11. A fuser member according to claim 1 wherein the thermal stabilizing agent further comprises nonfunctional polyorganosiloxane oil.

12. A fuser member according to claim 1 wherein the linear unsaturated-alkyl-group-substituted polyorganosiloxane is of the formula

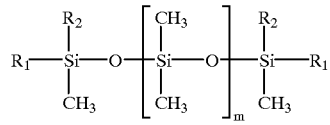

wherein $R_1$ and $R_2$ are selected from the group consisting of hydroxy and alkyl, alkoxy, alkene, and alkyne radicals having from 1 to about 10 carbon atoms, provided that at least one of $R_1$ and $R_2$ is alkene or alkyne, and m is an integer representing the number of repeat monomer units.

13. A fuser member according to claim 1 wherein the linear unsaturated-alkyl-group-substituted polyorganosiloxane is 1,3-divinyl tetramethyl disiloxane, 1,1,3,3-tetrally-1,3-dimethyl disiloxane, 1,3-divinyl-1,3-dimethyl-1,3-dihydroxy disiloxane, polydimethyl siloxane, vinyl dimethyl terminated, wherein n is from 1 to about 50, or mixtures thereof.

14. A fuser member according to claim 1 wherein the linear unsaturated-alkyl-group-substituted polyorganosiloxane is of the formula

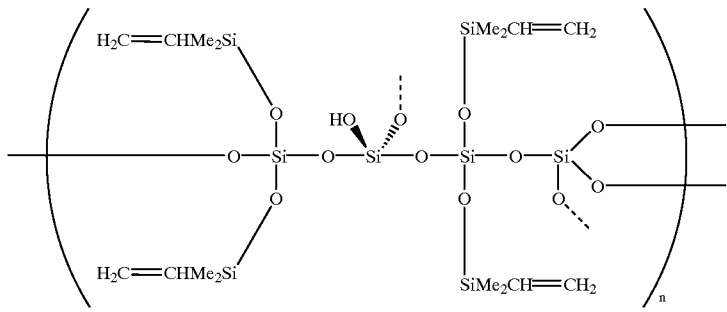

wherein n is an integer representing the number of repeat monomer units.

15. A fuser member according to claim 1 wherein the cyclic unsaturated-alkyl-group-substituted polyorganosiloxane is of the formula

wherein $R_3$ is an alkyl radical, an alkene radical, or an alkyne radical, $R_4$ is an alkene or alkyne radical, and n is an integer of from about 3 to about 6.

16. A fuser member according to claim 1 wherein the cyclic unsaturated-alkyl-group-substituted polyorganosiloxane is 1,3,5-triethenyltrimethylcyclotrisiloxane, 1,3,5,7-tetraethenyltetramethylcyclotetrasiloxane, 1,3,5,7-tetrallyltetramethylcyclotetrasiloxane, 1,3,5,7,9,11-hexaethenylhexamethylcyclohexasiloxane, or mixtures thereof.

17. A fuser member according to claim 1 wherein the cyclic unsaturated-alkyl-group-substituted polyorganosiloxane is 1,3,5,7-tetravinyl tetramethyl cyclotetrasiloxane.

18. A fuser member according to claim 1 wherein the thermal stabilizing agent contains the metal acetylacetonate or metal oxalate compound in an amount of from about 9 to about 59 parts by weight for every 4 to 30 parts by weight of the cyclic unsaturated-alkyl-group-substituted polyorganosiloxane and for every 4 to 30 parts by weight of the linear unsaturated-alkyl-group-substituted polyorganosiloxane.

19. A process which comprises (i) generating an electrostatic latent image on an imaging member; (ii) developing the latent image by contacting the imaging member with a developer; (iii) transferring the developed image to a copy substrate; and (iv) affixing the developed image to the copy substrate by contacting the developed image with a fuser member according to claim 1.

20. An image forming apparatus for forming images on a recording medium which comprises: (i) a charge-retentive surface capable of receiving an electrostatic latent image thereon; (ii) a development assembly to apply toner to the charge-retentive surface, thereby developing the electrostatic latent image to form a developed image on the charge retentive surface; (iii) a transfer assembly to transfer the developed image from the charge retentive surface to a copy substrate; and (iv) a fixing assembly to fuse toner images to a surface of the copy substrate, wherein the fixing assembly includes a fuser member according to claim 1.

* * * * *